(No Model.)

L. H. McCULLOUGH.
INSULATING WIRE.

No. 269,807. Patented Dec. 26, 1882.

Witnesses.
A. Ruppert,
H. J. England.

L. H. McCullough,
Inventor.
Holloway & Blanchard
Att'ys

UNITED STATES PATENT OFFICE.

LEWIS H. McCULLOUGH, OF RICHMOND, INDIANA.

INSULATING WIRES.

SPECIFICATION forming part of Letters Patent No. 269,807, dated December 26, 1882.

Application filed July 21, 1882. (No model.)

*To all whom it may concern:*

Be it known that I, LEWIS H. MCCULLOUGH, a citizen of the United States of America, residing at Richmond, in the county of Wayne and State of Indiana, have invented certain new and useful Improvements in the Methods of Insulating Wires, of which the following is a specification, reference being had therein to the accompanying drawings.

My invention relates to insulating-tubes and their couplings for containing and insulating wires to be used for conducting currents of electricity for telegraphic and other purposes; and the objects of my improvements are, first, to provide a tube for containing such wires that can be laid under ground, under water, or in the open air, as circumstances may require, and which may be prepared for use at the factory where they are made, or at any convenient place, and transported to the place where they are to be used, they being supplied with conducting-wires of any desired number and with the requisite insulating substance around them; second, to provide for such tubes or pipes a novel form of coupling for connecting the sections of the pipe together, it having a chamber at its central portion, in which the conducting-wires are joined together, and an aperture through which the insulating material can be poured into said chamber after the sections of pipe have been joined together; and, third, in certain combinations of the parts, as will be more fully explained hereinafter. I attain these objects by the devices illustrated in the accompanying drawings, in which—

Figure 1:
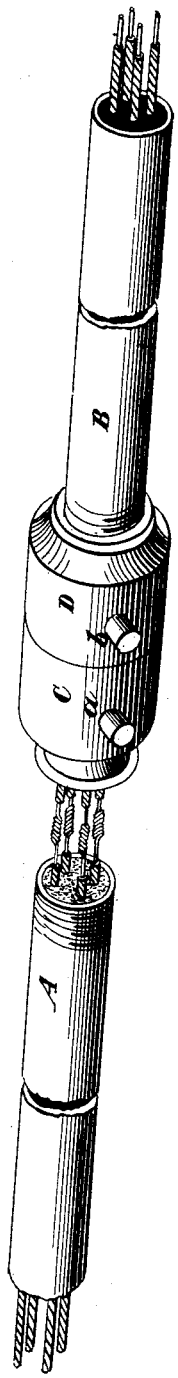
Figure 2:
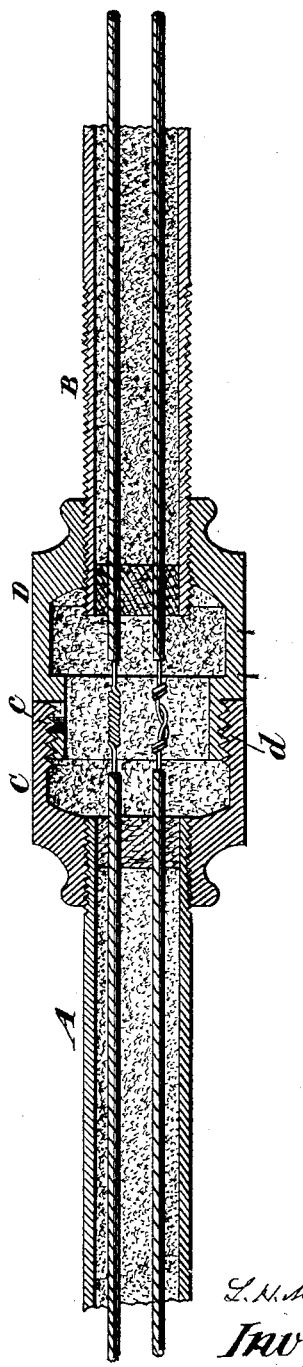

Figure 1 is a perspective view of two sections of a pipe containing conducting-wires, and showing also my improved coupling, one of the sections of the pipe being removed therefrom for the purpose of showing the method of uniting the ends of the wires; and Fig. 2 is a longitudinal section, showing the parts in position, the insulating material, the chamber in the coupling, and an aperture in a portion thereof for filling said chamber with insulating material.

Similar letters refer to similar parts throughout the several views.

Wires for conducting currents of electricity have heretofore been placed in pipes which have been laid under ground, the wires passing through them having been surrounded with various kinds of insulating material; but all of the various plans with which I am acquainted are objectionable for one or more of the following reasons: first, the great difficulty that has been experienced in perfectly insulating the wires in the pipe after it has been laid in the ground; second, the difficulty of making perfectly-tight joints between the different sections of the pipe, so as to exclude all moisture therefrom; and, third, the absence of any adequate provision for uncoupling the sections of the pipe for examining or repairing the joints in the conducting-wires, or for uniting them together when the tube is laid. My invention is designed to remedy these and other objections, for doing which I provide two or more sections of pipe, A and B, made of iron or any other suitable material, the section lettered A having upon one of its ends a short screw-thread for securing thereto one portion of a coupling, soon to be described, while upon its opposite end there is formed a longer thread—such as is shown in Fig. 2—both or all of the sections of the pipe being alike in this respect.

The advantage derived from the above arrangement of the pipes is that when they have been laid in a trench formed for their reception and it becomes necessary for any reason to remove one of the sections it can be done by simply screwing back the portion C of the coupling and the corresponding portion on the next section, when the intermediate section can be removed without disturbing any of the other parts, before doing which the conducting-wires can be disconnected and again connected after the section of pipe has been returned to its position before the coupling has been screwed back to its original position.

The coupling above alluded to consists of the parts C and D, the former being provided with a female screw-thread in its outer or reduced end, another upon its inner or enlarged end, the first named being for the reception of a male thread formed on one end of section of pipe A and the latter for the reception of a male screw formed upon a projecting portion of the opposite part, D, of the coupling, the outer or reduced end of which is also provided with a female thread for the reception of a male screw formed on section B of the pipe, the lastnamed thread being extended along the pipe for a considerable distance, so that when it is desirable to remove the section the portion D of the coupling may be screwed back far enough to leave it free from the portion or part C.

For the purpose of facilitating the screwing together and the unscrewing of the parts of the coupling, each one of them is provided with a projection, as shown at *a* and *b*, Fig. 1, to which a wrench of suitable construction can be placed, by which they can be turned, or one can be turned and the other prevented from turning. When tubes and conducting-wires are prepared for laying down at a convenient point, distant from where they are used, (the wires being arranged in the tubes or pipes and properly insulated with a composition consisting of Burgundy pitch, ten parts; rosin, forty parts; and coal-tar, fifty parts, the whole boiled until it is in a condition that will cause it to become hard as it cools; or it may be of any other material or compound that is readily melted, and that hardens in cooling,) as is contemplated by me, it is important that provision should be made for readily coupling them together when laid, and for properly insulating the portions thereof which pass through the coupling devices. For the accomplishment of this object the two parts of the couplings are each provided with a chamber, substantially such as is shown in Fig. 2, into which a quantity of melted insulating material is poured through the aperture *c*, formed in the projecting portion of the part D, before it has been screwed so far into part C as to cause it to cover said aperture, when, by screwing the parts together until the outer end of C comes in contact with the shoulder on D, the material passed through the aperture will be so compressed as to cause it to fill all parts of said chamber and the aperture *c*, and will thus form a perfectly water-tight joint, which will also exclude the air should the pipe or tube be laid in such a manner as to be exposed thereto.

In preparing the pipes or tubes and conducting-wires, as above described, the conducting-wires are to be caused to protrude beyond the ends of the section, as shown in the drawings, in order that when the pipes are placed in position for use the ends of said wires may be joined together, as shown in Fig. 1 of the drawings.

The construction of the coupling may, if desired, be varied by forming a female thread in both of the enlarged ends thereof, and a thimble be provided with a screw-thread on its surface, on which to screw the parts of the coupling, the aperture for filling the chamber being formed in said thimble, in which case the aperture formed in the contracted ends of the coupling would be without screw-threads, and the ends of the pipes made to fit therein in such a manner as to allow the coupling-section to slide thereon. This form of construction would produce the tight joint which is regarded as of importance, as the screwing up of the section after these chambers have been filled with the melted insulating material would force a portion of it around the ends of the pipes, and thus fill any space that might exist between the pipes and the parts of the coupling into which they might pass.

For the purpose of keeping the wires separate and apart until each tube is filled with concrete, they are insulated with cotton or any other non-conducting material, and for the same purpose the wires are drawn through wooden heads in the ends of the tubes after filling with insulating material, as shown in the drawings, and these wooden heads enable the operator to draw the wires taut and retain them in that position until the tube is filled with the insulating compound. After the connections of the wires have been made, as shown in the drawings, and before the space between the sections has been filled, the joints are soldered and then coated with collodion. By preference the tubes are filled from the bottom, so as to most effectually exclude the air and make the concrete solid.

Having thus described my invention, what I claim, and desire to secure by Letters Patent, is—

A conduit for electric wires, consisting of pipes and coupling-sections, said coupling-sections formed with a perforation in the female-threaded portion, through which semi-fluid insulating material can be poured, and having recessed chambers, as shown, section C screw-threaded to receive the screw-threaded section D, each outer end of said section screw-threaded to screw onto pipe-sections A and B, and each pipe-section having a perforated wooden plug inserted in each end, substantially as set forth.

In testimony whereof I affix my signature in presence of two witnesses.

LEWIS H. McCULLOUGH.

Witnesses:
LAWRENCE P. GOOD,
W. M. THOMPSON.